United States Patent
Crespi et al.

[11] Patent Number: 6,160,694
[45] Date of Patent: Dec. 12, 2000

[54] ELECTRONIC BRIDGE AND HALF-BRIDGE CIRCUITS WITH SUPPRESSION OF HIGH-VOLTAGE TRANSIENTS ON THE POWER SUPPLY LINE

[75] Inventors: Angelo Crespi, Cinisello Balsamo; Vanni Poletto, Casale Monferrato, both of Italy

[73] Assignee: STMicroelectronics S.r.l., Agrate Brianza, Italy

[21] Appl. No.: 09/264,445

[22] Filed: Mar. 8, 1999

[30] Foreign Application Priority Data

Apr. 10, 1998 [EP] European Pat. Off. .............. 98830221

[51] Int. Cl.$^7$ ....................................................... H02H 3/22
[52] U.S. Cl. .............................................. 361/111; 361/18
[58] Field of Search ........................... 361/18, 91.1, 91.5, 361/91.6, 111; 323/270, 271, 276, 281

[56] References Cited

U.S. PATENT DOCUMENTS

| | | | |
|---|---|---|---|
| 5,764,088 | 6/1998 | Lavieville et al. ...................... | 361/111 |
| 5,786,685 | 7/1998 | Lange et al. ............................ | 323/270 |

FOREIGN PATENT DOCUMENTS

| | | | |
|---|---|---|---|
| 0 294 887 A2 | 6/1988 | European Pat. Off. ........ | H03K 17/08 |
| 0 340 918 A2 | 4/1989 | European Pat. Off. ........ | H03K 17/08 |
| 0 680 147 A2 | 4/1995 | European Pat. Off. ..... | H03K 17/082 |
| WO 94/23497 | 10/1994 | WIPO ............................ | H03K 17/08 |

*Primary Examiner*—Ronald W. Leja
*Attorney, Agent, or Firm*—Theodore E. Galanthay; Allen, Dyer, Doppelt, Milbrath & Gilchrist, P.A.

[57] ABSTRACT

An electronic circuit with suppression of high-voltage transients on the power supply line includes first and second power transistors series-connected between first and second power supplies, and first and second driving circuits for respective first and second power transistors. The first driving circuit includes a first diode and a first Zener diode, and the second driving circuit includes a second diode and a second Zener diode. Anodes of the first diode and the first Zener diode are connected to the cathode of the second Zener diode. A cathode of the first Zener diode is connected to the first power supply. A cathode of the first diode is connected to a gate of the first power transistor. Anodes of the second diode and the second Zener diode are connected together. A cathode of the second diode is connected to a gate of the second power transistor.

24 Claims, 8 Drawing Sheets

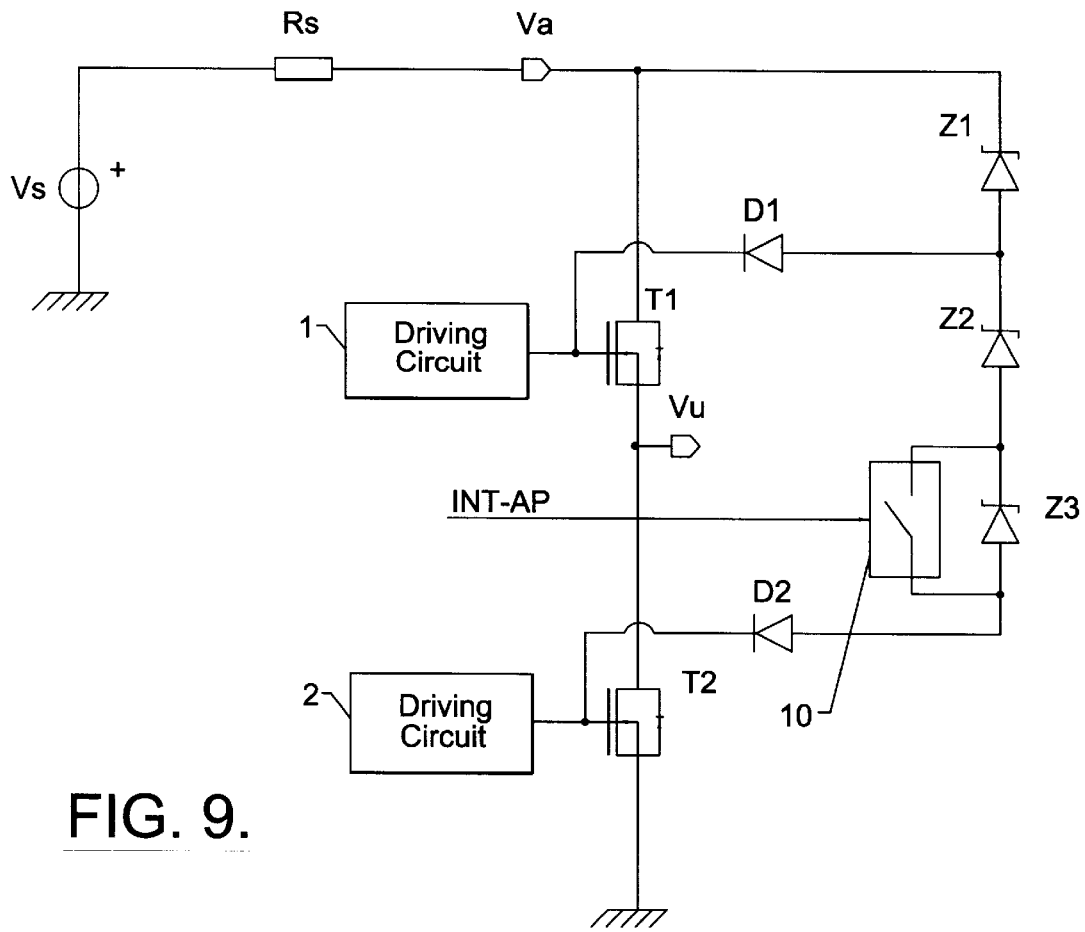
FIG. 9.
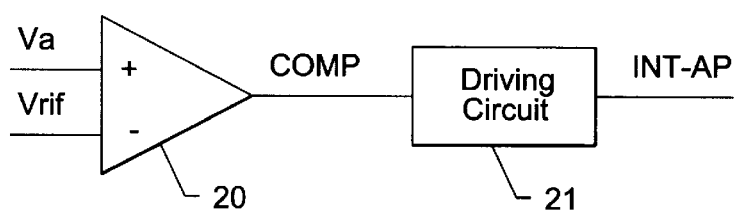
FIG. 10.
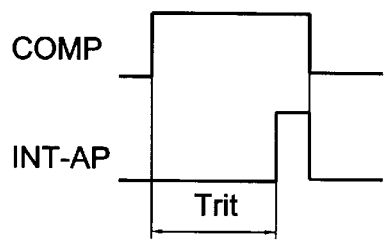

1

ELECTRONIC BRIDGE AND HALF-BRIDGE CIRCUITS WITH SUPPRESSION OF HIGH-VOLTAGE TRANSIENTS ON THE POWER SUPPLY LINE

FIELD OF THE INVENTION

The present invention relates to the field of electronics, and, more particularly, to a bridge or half-bridge electronic circuit.

BACKGROUND OF THE INVENTION

Voltage transients at a voltage higher than the normal voltage and higher than the voltage that circuits can withstand without damage can occur on the power supply line of electronic circuits. This occurs, for example, in the automotive field. Electronic circuits, particularly half-bridge and bridge circuits, must be protected against these dangerous voltages.

FIG. 1 illustrates a bridge or half-bridge electronic circuit, designated by the reference numeral 100, connected to a power supply voltage source Vs. Rs designates the internal resistance of the power supply voltage source Vs, while Va designates the power supply terminal of the electronic circuit 100. The chart associated with FIG. 1 plots the power supply voltage Vs, including transients whose voltage is higher than the normal voltage. The method normally used to protect electronic circuits against high-voltage transients on the power supply line consists in adding an adapted transient suppression device.

FIG. 2 illustrates the prior art of adding a transient suppression device, designated by the reference numeral 200. The transient suppression circuit 200 is thus placed between the power supply terminal Va of the circuit and ground. The chart shows that when the voltage Va reaches the value Vm, a value that will not damage the electronic circuit 100, the transient suppression device 200 limits the voltage Va to the value Vm. The suppression device 200 must therefore be able to absorb the energy of the voltage transient and must therefore contain additional high-voltage power components which are bulky and expensive.

SUMMARY OF THE INVENTION

An object of the present invention is therefore to provide electronic bridge and half-bridge circuits with suppression of high-voltage transients on the power supply line while not requiring additional power components.

Another object of the present invention is to provide electronic bridge and half-bridge circuits with suppression of high-voltage transients on the power supply line which are able to self-protect against the voltage transients.

Another object of the present invention is to provide electronic bridge and half-bridge circuits with suppression of high-voltage transients on power supply lines in which differential output voltage limiting is provided during power supply voltage transients.

Another object of the present invention is to provide bridge and half-bridge circuits with suppression of power supply voltage transients which are capable of discriminating between transients to be suppressed and high-energy transients.

Another object of the present invention is to provide bridge and half-bridge circuits with suppression of high-voltage transients on the power supply line which are highly reliable, relatively easy to manufacture and at competitive costs.

These objects and others which will become apparent hereinafter are achieved by an electronic circuit with suppression of high-voltage transients on the power supply line, comprising at least one pair of power transistors which are series-connected between a power source and ground. Each power transistor is provided with a respective driving circuit. A driving circuit includes, for each one of the power transistors, a diode and a Zener diode. The diode of the power transistor connected to the supply voltage is connected by its cathode terminal to the base terminal of the power transistor, and the diode is connected by its anode terminal to the anode terminal of the Zener diode. The cathode terminal of the Zener diode is connected to the power supply. The cathode terminal of the Zener diode of the power transistor that is connected to ground is connected to the anode terminal of the Zener diode corresponding to the power transistor connected to the power supply.

BRIEF DESCRIPTION OF THE DRAWINGS

Further characteristics and advantages of the invention will become apparent from the description of preferred but not exclusive embodiments of the circuit according to the invention, illustrated only by way of non-limitative example in the accompanying drawings, wherein:

FIG. 9 is a circuit diagram, partially in block form, of the fourth embodiment of the circuit according to the present invention for a half-bridge configuration circuit;

FIG. 10 is a block diagram of a circuit for discriminating among power supply voltage transient types according to the present invention;

DETAILED DESCRIPTION OF THE PREFERRED EMBODIMENTS

Figure 1:
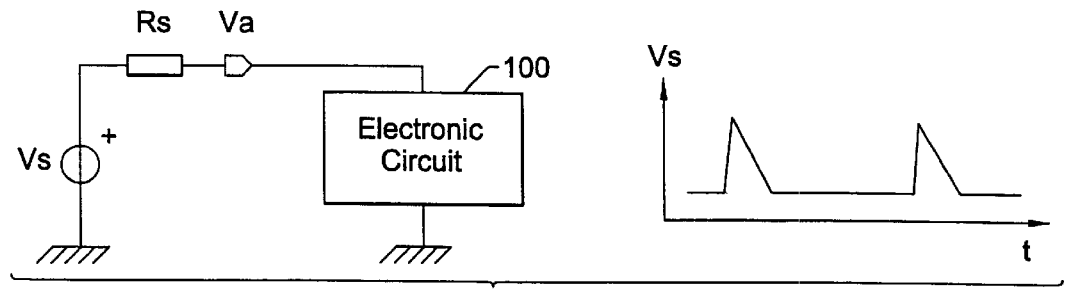
FIG. 1 is a block diagram of an electronic bridge and half-bridge circuit connected to the power supply line, and a chart showing power supply voltage transients according to the prior art.
Figure 2:
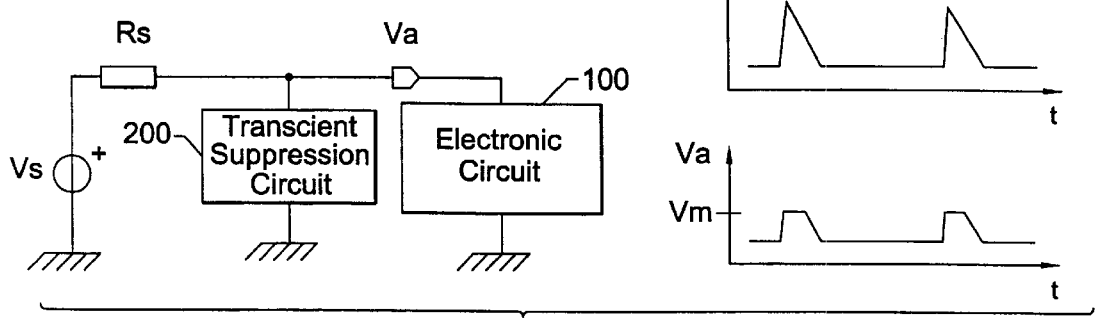
FIG. 2 is a block diagram of an electronic bridge or half-bridge circuit connected to the power supply line with a high-voltage transient suppression device, and a chart showing the supply voltage and its clipping according to the prior art.
Figure 3:
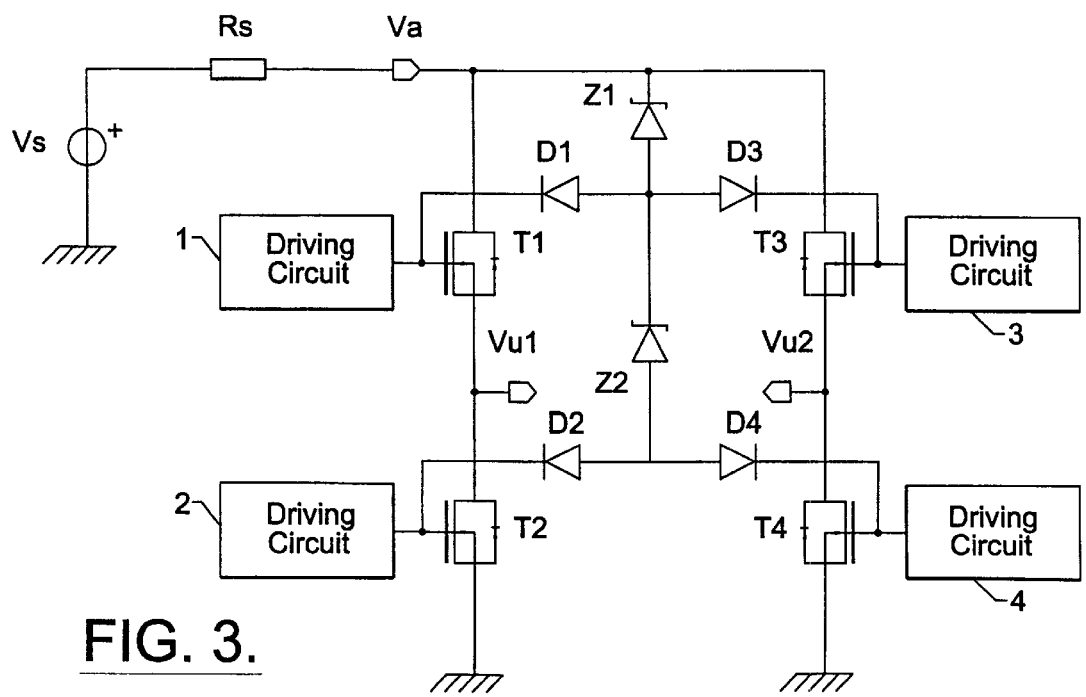
FIG. 3 is a circuit diagram, partially in block form, of an electronic bridge circuit according to the present invention.

In all the figures, identical elements are designated by the same reference numerals. FIGS. 1 and 2 are not described any further since they have already been discussed above. With reference therefore to FIG. 3, the figure is a circuit diagram, partially in block form, of a first embodiment of a circuit of the bridge type, according to the present invention. The bridge circuit is formed by a first pair of transistors T1, T2, which are series-connected between a power source Vs and ground, and by a second pair of transistors T3, T4, which are also series-connected together and are parallel-connected to the first pair of transistors. The transistors T1, T2, T3 and T4 can be N-channel DMOS transistors, as shown in FIG. 3, or can be transistors of another kind.

The transistors T1–T4 are driven by driving circuits, designated by the reference numerals 1, 2, 3 and 4 respectively. The driving circuits 1, 2, 3 and 4 bias adapted diodes D1–D4 and Zener diodes Z1 and Z2, and allow suppression of high-voltage transients on the power supply line. In particular, the diodes D1 and D3 have common-connected anode terminals and are connected by their cathode terminals to the bases of the transistors T1 and T3 respectively. Likewise, the diodes D2 and D4 have common-connected anode terminals and are connected by their cathode terminals to the base terminals of the transistors T2 and T4 respectively. The Zener diodes Z1 and Z2 are respectively connected by their anode terminal to a common point between the diodes D1 and D3 and the diodes D2 and D4. The cathode terminals of the Zener diodes Z1 and Z2 are respectively connected to the power supply line and to the common point between the diodes D1 and D3.

If the power supply voltage Va reaches a value Vm, the value Vm is given by:

$$V_m = V_{Z1} + V_{Z2} + V_{beD2} + V_{gsT2} = V_{Z1} + V_{Z2} + V_{beD4} + V_{gsT4}.$$

The value Vm can be withstood by the electronic circuit. The power transistors T1–T4 are switched on by the diodes D1–D4 and the Zener diodes Z1 and Z2. In this way, the supply voltage Va can never exceed the value of Vm. The diodes D1–D4 and the Zener diodes Z1 and Z2 are not power components. A high level of current does not flow across them because their function is to switch on the power transistors T1–T4 in which the high-level current flows.

During high-voltage transient suppression, the total current Is that arrives from the power source and flows across the transistors T1–T4 is given by:

$$I_s = (V_s - V_m)/R_s.$$

If the four power transistors T1–T4 have the same dimensions, and if the voltages of the Zener diodes Z1 and Z2 are chosen so that a voltage equal to half the voltage Vm occurs across each power transistor T1–T4, then the high-voltage transients on the power supply line are suppressed by distributing their energy in equal amounts among the power transistors T1–T4.

The voltage equal to half the voltage Vm is given by the following equation:

$$V_{z2} = V_{Z1} + V_{beD1} + V_{gsT1} = V_{Z1} + V_{beD3} + V_{gsT3}.$$

VbeD1 and VbeD3 are the direct biasing voltages of the diodes D1 and D3 respectively. VgsT1 and VgsT3 are the gate-source voltages of the transistors T1 and T3 respectively, while Vz1 and Vz2 are the trigger voltages of the Zener diodes Z1 and Z2 respectively. The high-voltage transients on the power supply line are suppressed by distributing their energy in equal amounts among the power transistors T1–T4.

The power dissipated by each power transistor is given by:

$$P = (V_m/2) \times (I_s/2) = (V_m \times I_s)/4.$$

During normal operation without transients on the power supply line, the diodes D1–D4 allow the four power transistors T1–T4 to be switched on and off independently.

Figure 4:
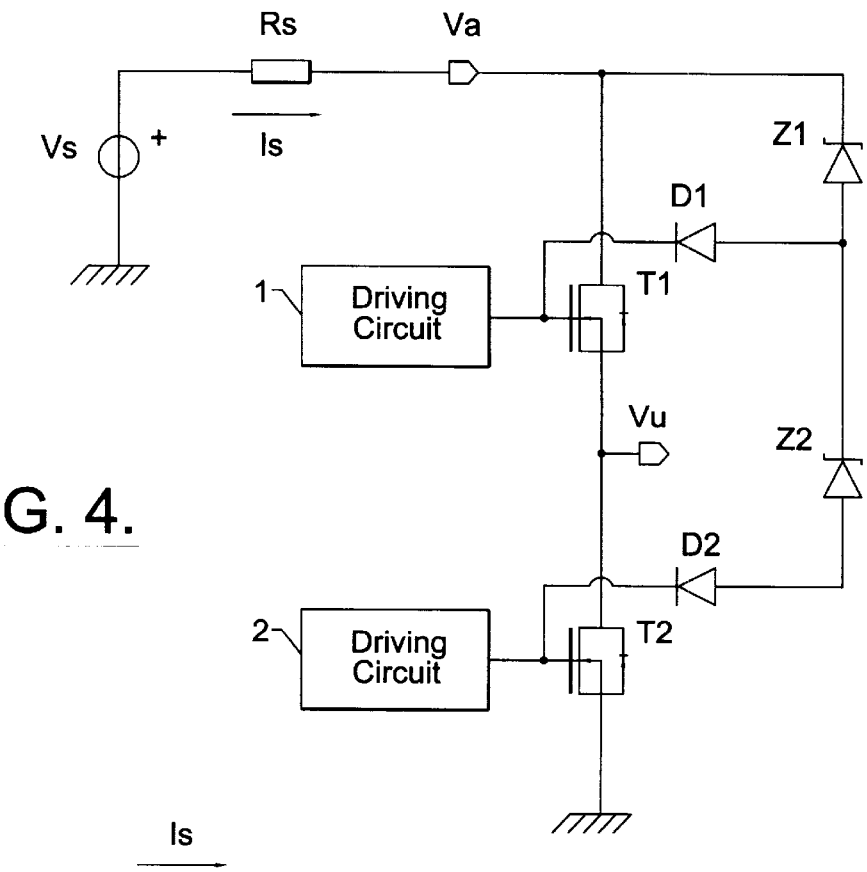
FIG. 4 is a circuit diagram, partially in block form, of an electronic half-bridge circuit according to the present invention.

FIG. 4 illustrates the circuit according to the present invention applied to a half-bridge circuit. In the figure, T1 and T2 are the two power transistors that form the half-bridge circuit. As mentioned earlier for the bridge circuit, they can be N-channel DMOS transistors, as shown in FIG. 4, or can be transistors of another type. The power transistors T1 and T2 are driven by the driving circuits 1 and 2. The driving circuits 1 and 2 also bias the diodes D1 and D2 and the Zener diodes Z1 and Z2 which allow suppression of high-voltage transients on the power supply line.

If the supply voltage Va reaches a value Vm that the electronic circuit can withstand, the value Vm is given by:

$$V_m = V_{Z1} + V_{Z2} + V_{beD2} + V_{gsT2}.$$

The power transistors T1 and T2 are switched on by diodes D1 and D2 and the Zener diodes Z1 and Z2. The supply voltage Va cannot exceed the value of Vm. During suppression of high-voltage transients, the total current Is that arrives from the power source and flows across the power transistors T1 and T2 is given by:

$$I_s = (V_s - V_m)/R_s.$$

If the two power transistors T1 and T2 have the same dimensions, and if the voltages of the Zener diodes Z1 and Z2 are chosen so that a voltage equal to half the voltage Vm occurs across the two power transistors, then the high-voltage transients on the power supply line are suppressed by distributing their energy in equal parts between the power transistors T1 and T2. The voltage equal to half the voltage Vm is given by:

$$V_{z2} = V_{Z1} + V_{beD1} + V_{gsT1}.$$

$V_{beD1}$ is the voltage between the base and the emitter of the diode D1, and $V_{gsT1}$ is the voltage between the gate and the source of the transistor T1.

The power dissipated by each power transistor is given by:

$$P = (V_m/2) \times I_s = (V_m \times I_s)/2.$$

During normal operation without transients on the power supply line, the diode D1 allows the transistor T1 to switch on and the diode D2 allows T1 to be switched off, even when the transistor T2 is on.

Figure 5:
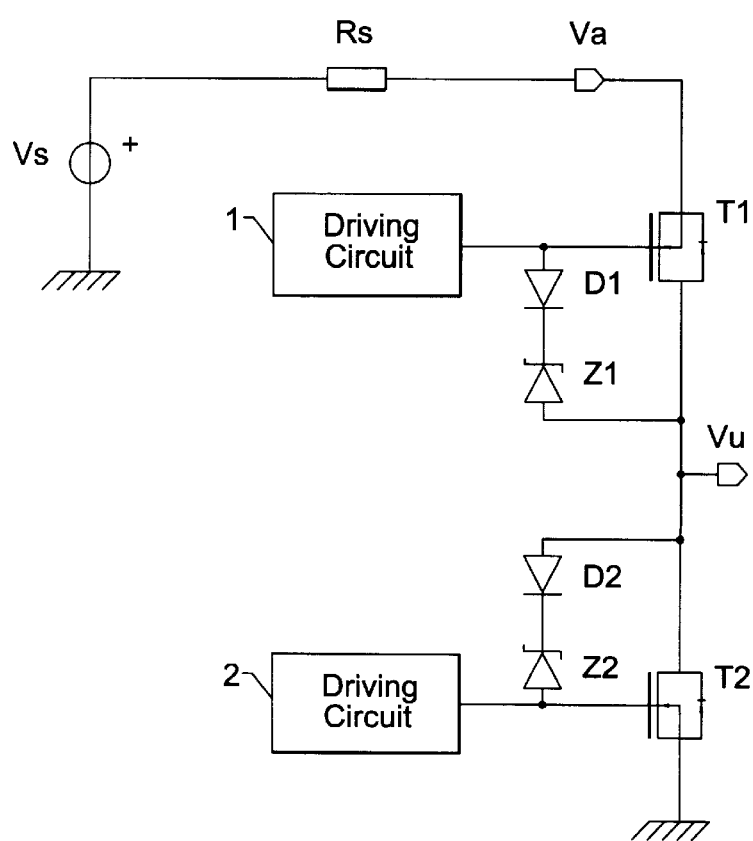
FIG. 5 is a view of a second embodiment of the circuit shown in FIG. 4.

FIG. 5 illustrates the diagram for the half-bridge circuit, which is similar to the circuit shown in FIG. 4, but in which the transistor T1, which is connected to the power supply line, is of the P-channel DMOS type instead of the N-channel DMOS type. In this circuit, the transistor T2 is an N-channel DMOS transistor. In this case, if the supply voltage Va reaches a voltage Vm given by:

$$V_m = V_{gsT1} + V_{Z1} + V_{beD1} + V_{Z2} + V_{beD2} + V_{gsT2},$$

then the power transistors T1 and T2 are switched on by the diodes D1 and D2 and the Zener diodes Z1 and Z2. The supply voltage Va cannot exceed the value of Vm. During normal operation without transients on the power supply line, the diodes D1 and D2 respectively allow the transistors T1 and T2 to switch on.

A diagram similar to the one shown in FIG. 5 can be used for the bridge circuit shown in FIG. 3 as well, provided the two power transistors T1 and T3 connected to the power supply are of the P-channel DMOS type. If an inductive load is connected between the outputs Vu1 and Vu2 of the bridge circuit of FIG. 3, then during high-voltage transients on the power supply line the differential output voltage |Vu1−Vu2| can assume, due to the recirculation diodes of the power transistors T1–T4, a value which is approximately equal to the voltage to which the transients Vm are limited. This voltage value may be too high for some particular loads.

Figure 6:
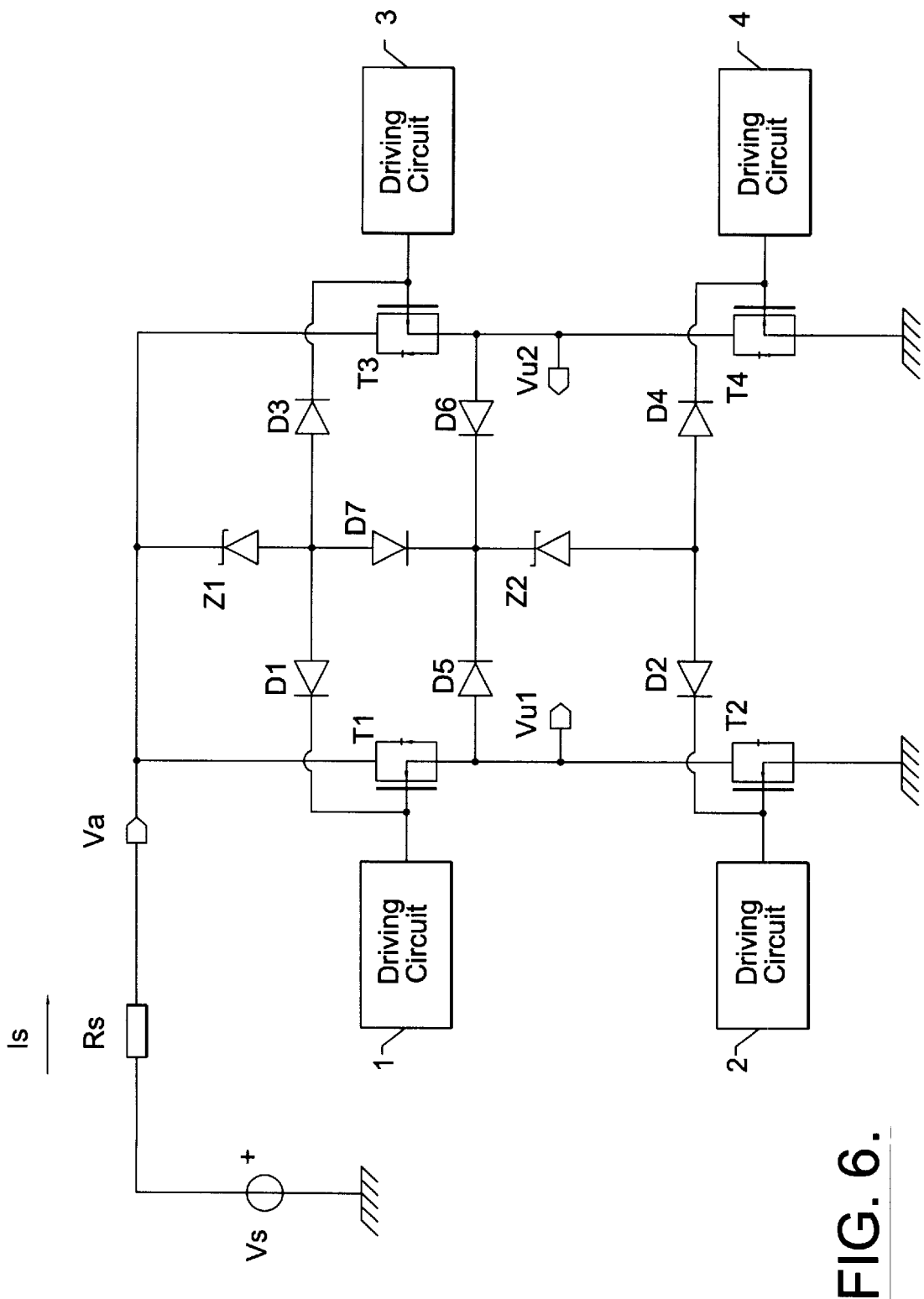
FIG. 6 is a circuit diagram, partially in block form, of a third embodiment of the circuit according to the present invention.

In this regard, FIG. 6 illustrates a circuit diagram derived from the diagram of FIG. 3, Diodes D5, D6 and D7 are added to limit the differential output voltage |Vu1−Vu2| to a lower value. The diode D5 is connected by its anode terminal to the source terminal of the transistor T1 and, by its cathode terminal to the cathode terminal of the diode Z2 and to the cathode terminal of the diode D6 arranged opposite thereto. The anode terminal of the diode D6 is connected to the source terminal of the transistor T3.

The diode D7 is connected by its cathode terminal to the common point between the cathode terminals of the diodes D5, D6 and Z2 and its anode terminal is connected to the common point of the anode terminals of the diodes D1, D3 and Z1. The outputs Vu1 and Vu2 are limited respectively to the maximum values Vum1 and Vum2 given by:

$$V_{um1} = V_{beD5} + V_{Z2} + V_{beD2} + V_{gsT2},$$

$$V_{um2} = V_{beD6}\, V_{Z2} + V_{beD4} + V_{gsT4}, \text{ where}$$

$$V_{um1} \simeq V_{um2}.$$

Vu1 and Vu2 can vary over the following intervals:

$$V_{u1} : -V_{be} \div V_{um1},$$

$$V_{u2} : -V_{be} \div V_{um2}.$$

$V_{be}$ is the voltage of the recirculation diodes of the transistors T2 and T4.

The differential output voltage |Vu1−Vu2| can reach a maximum value of:

$$|V_{u1} - V_{u2}|_{max} = V_{be} + V_{um1} = V_{be} + V_{um2}.$$

The transients that occur with a low resistance of the power source Rs have, with other parameters being equal, a greater ability to transfer power to the electronic circuit and are, accordingly, more dangerous. The total current Is that must flow across the power transistors T1–T4 during transient suppression is given by:

$$I_s = (V_s - V_m)/R_s.$$

The total current Is is therefore inversely proportional to Rs. If the source voltage Vs and the voltage Vm, at which transient suppression occurs are equal, then transients with a lower source resistance Rs are more dangerous. This is because they cause higher currents to flow across the power transistors T1–T4, thus dissipating more power.

Figure 7:
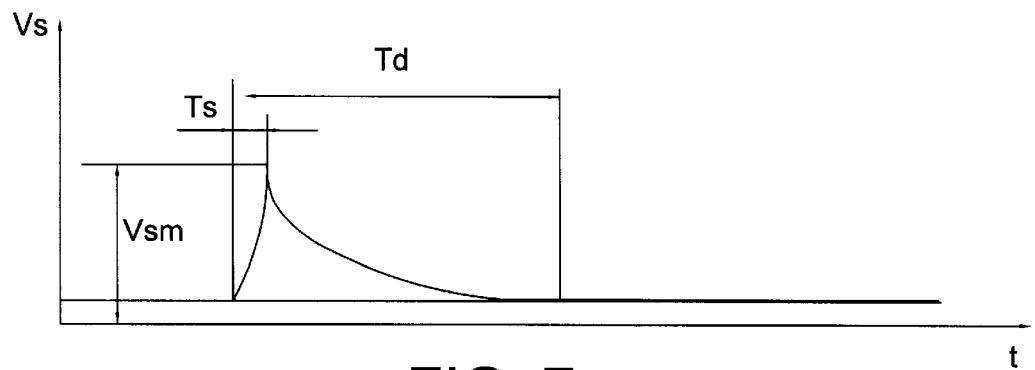
FIG. 7 is a chart showing a plot of the power supply voltage over time according to the present invention.

In some applications, for example, for motor vehicles, there can be two kinds of transients on the power supply line. The values indicated hereafter are for the following parameters: maximum voltage Vsm, value of the internal resistance Rs of the power source, rise time Ts and duration Td. FIG. 7 plots the parameters Vsm, Ts and Td. The two types of transients can be as follows. For transient 1, Vsm1 cannot be withstood by the electronic circuit, and the other parameters are short rise time Ts1, short duration Td1, and high internal resistance Rs1 of the power source. It is assumed that the bridge or half-bridge electronic circuit can withstand the current and the electric power required to suppress the transient For transient 2, Vsm2 can be withstood by the electronic circuit, and the other parameter values are long rise time Ts2, long duration Td2, and low internal source resistance Rs2. It is assumed that the bridge or half-bridge circuit is unable to withstand the go current and the electric power required to suppress the transient 2.

For $V_{sm2} < V_{cm} < V_{sm1}$, Vcm is the maximum power supply voltage that can be applied to the electronic circuit without damaging it. Transient 1 must be suppressed since Vsm1>Vcm. Transient 2 is not suppressed since Vsm2<Vcm. Furthermore, transient 2 must not be suppressed by the electronic circuit since the energy that the transient would transfer to the circuit would be very high because Rs2 is low and Td2 is high.

Different cases can be distinguished on the basis of the relative values of the parameters of transients 1 and 2. For case 1, if the difference (Vcm−Vsm2) is sufficiently large and ensures error margins sufficient to place Vm between Vcm and Vsm2, it is possible to use the circuit diagrams of FIGS. 3 and 4 by choosing Vm between Vcm and Vsm2. In this manner, the electronic circuit suppresses transients of type 1, but does not suppress transients of type 2. For Case 2, if the difference (Vcm−Vsm2) is small and does not ensure error margins sufficient to place Vm between Vcm and Vsm2, it is possible to use the diagrams of FIGS. 8 and 9 for the bridge circuit and for the half-bridge circuit, respectively.

Figure 8:
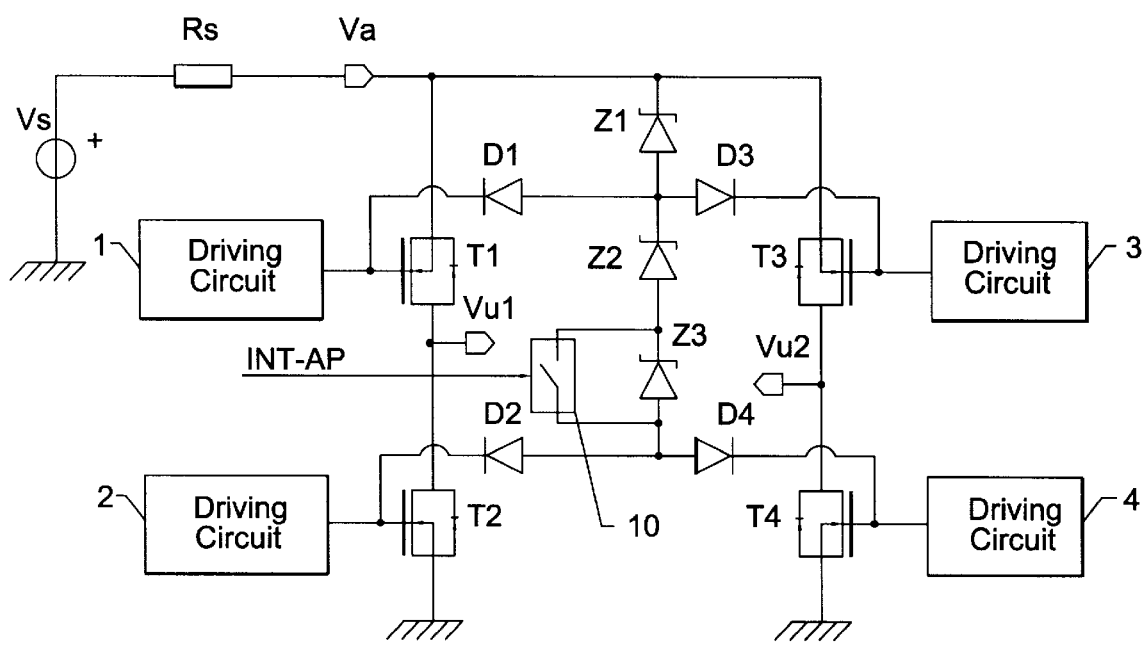
FIG. 8 is a circuit diagram, partially in block form, of a fourth embodiment of the circuit according to the present invention for a bridge configuration circuit.

In FIGS. 8 and 9 an additional Zener diode Z3 is added and a switch 10 is parallel-connected thereto. The Zener diode Z3 is series-connected to the Zener diode Z2. The diode Z3 and the switch 10 allow two possible values for the supply voltage Va, which causes transient suppression to intervene:

Vm1: occurs when the switch 10 is closed, and

Vm2: occurs when the switch 10 is open.

When the switch 10 is open, the voltage at which transient suppression intervenes is increased by the value of the voltage of the Zener diode Z3, i.e., Vz3:

$$V_{m2} = V_{m1} + V_{z3}.$$

The state of the switch 10 depends on the logic value of a signal INT-AP. If the signal INT-AP is equal to 1, the switch 10 is open. Otherwise, if the signal is equal to 0, the switch 10 is closed.

Case 2 can be distinguished further into cases 2a and 2b. With respect to case 2a, if the duration Td1 of the transient 1 is sufficiently lower than the rise time Ts2 of transient 2, then discrimination between the two transient types can be performed by creating the signal INT-AP with the circuit shown in FIG. 10. In this figure, a comparator 20 receives at an input the supply voltage Va and an overvoltage reference voltage Vrif to generate at an output a comparison signal COMP, which is fed into a delay block 21. The delay block 21 supplies at an output the signal INT-AP. This signal is obtained by delaying the rising edges of the signal COMP for a time interval Trit, as shown by the chart included in FIG. 10.

Figure 11:
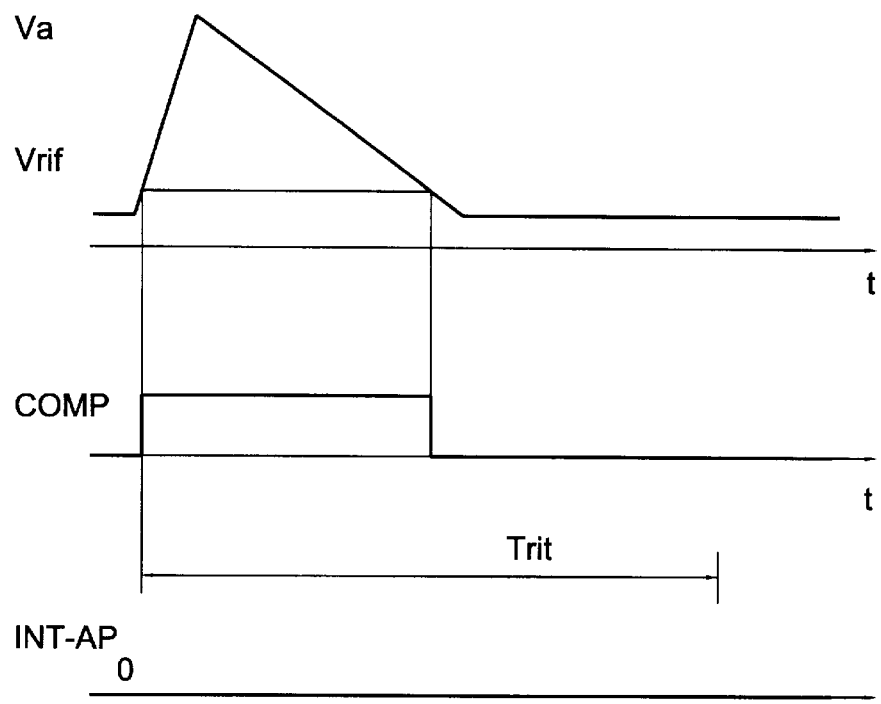
FIG. 11 is a chart showing plots of signal waveforms detected in the circuit of FIG. 10 for a first type of power supply voltage transients.
Figure 12:
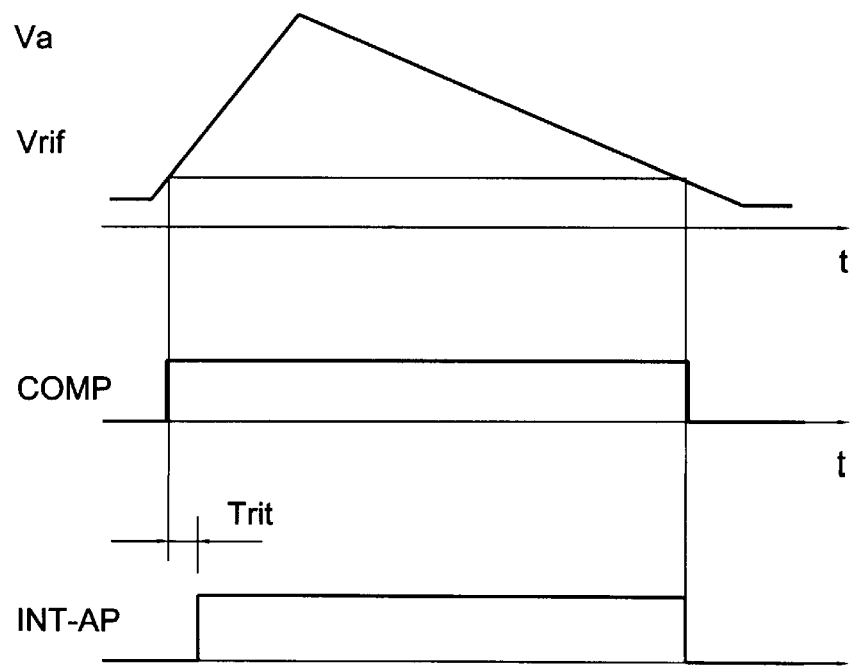
FIG. 12 is a chart showing plots of signal waveforms detected in the circuit of FIG. 10 for a second type of power supply voltage transients.

The falling edges of the signal COMP are not delayed. If the signal COMP has a rising edge followed by a falling edge after a time interval of less than Trit, then the output signal INT-AP remains at the value 0 without switching. The waveforms for transient 1 and for transient 2 are shown in FIGS. 11 and 12 respectively. If transient 1, which is fast and at high voltage and must be suppressed, occurs as shown in FIG. 11, the signal INT-AP remains at the value 0 and the switch 10 of FIGS. 8 (for the bridge circuit) and 9 (for the half-bridge circuit) remains closed. Transient suppression is activated, limiting the supply voltage Va to the value of Vm1.

If instead transient 2, which is slow and at low voltage and high energy and must not be suppressed, occurs as shown in FIG. 12, the signal INT-AP switches to the value 1 after a time interval Trit has elapsed from the moment when the supply voltage Va exceeded the overvoltage reference value Vrif. The signal INT-AP remains at the value 1 throughout the transient until the power supply voltage Va is once again lower than the reference voltage Vrif. During the transient, the switch 10 of FIGS. 8 and 9 remains open and the Zener diode Z3 raises the transient suppression voltage from the value Vm1 to the value Vm2. If one chooses the transient suppression voltage Vm2 so that $$V_{m2} > V_{sm2},$$

the bridge or half-bridge circuit does not suppress the low-voltage, high energy transient.

Figure 13:
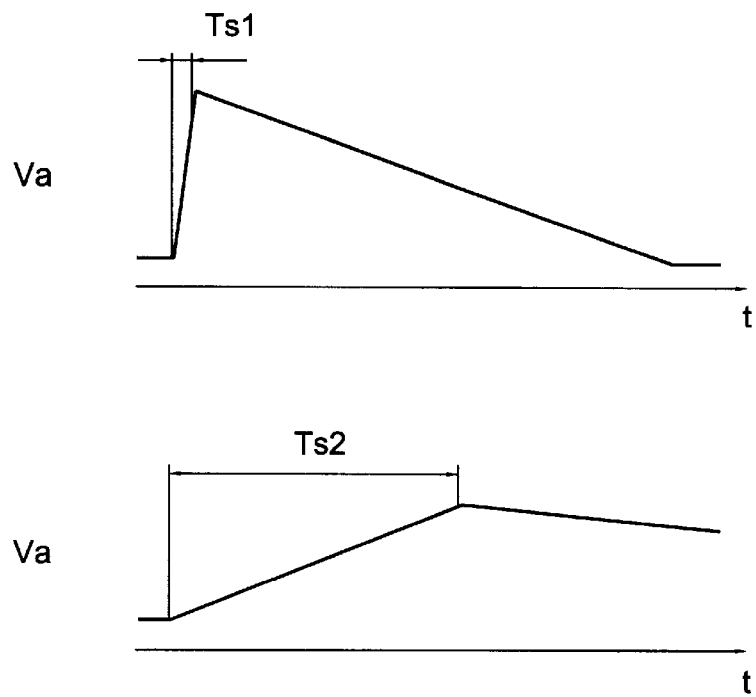
FIG. 13 is a time chart showing plots of two different types of power supply voltage transients according to the present invention.
Figure 14:
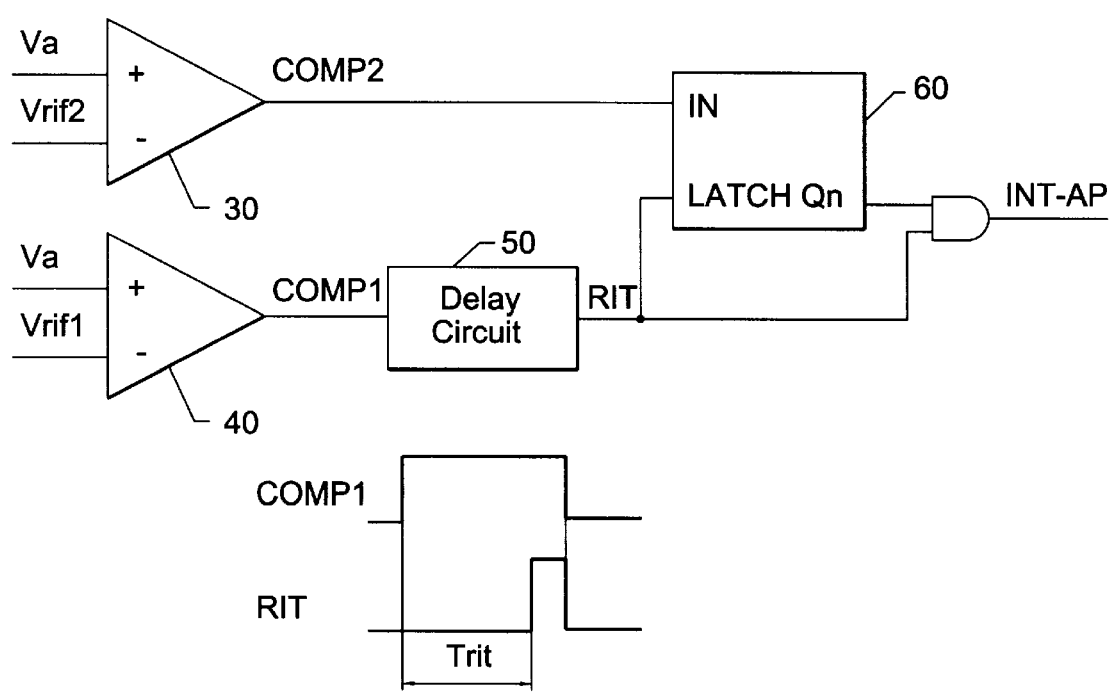
FIG. 14 is a block diagram of a second embodiment of the circuit for discriminating among power supply voltage transient types according to the present invention.

With respect to case 2*a*, if the duration Td1 of the transient 1 is not shorter than the rise time Ts2 of transient 2 to allow application of the concepts of case 2*a*, but there is a sufficient difference between the rise times Ts1 and Ts2 as shown in FIG. 13, then the logic signal INT-AP can be generated using the circuit of FIG. 14. This circuit uses two comparators 30 and 40, which receives at respective inputs the supply voltage Va and the references Vrif1 and Vrif2, with:

$$V_{rif1} < V_{rif2} < V_{m1}.$$

Vm1 is the value of the voltage Va to which fast, high-voltage transients are limited. The signal provided at an output from the comparator 40, designated by COMP 1, is applied as an input to a delay block 50. The delay block 50 provides at an output a logic signal RIT which is obtained by delaying the rising edges of the signal COMP 1 for a time interval Trit.

The falling edges of the signal COMP 1 are not delayed. If COMP 1 has a rising edge followed by a falling edge after a time interval of less than Trit, then the output RIT remains at the logic value 0 without switching. The signal at an output from the comparator 30, designated by COMP 2, is fed together with the signal RIT to a latch circuit 60. The signal COMP 2 is the input IN of the latch 60, while the signal RIT that is an output from the delay block 50 is applied at the input LATCH.

When the LATCH input is equal to 0, the inverted output of the latch circuit 60 Qn equals the inverted IN signal which equals the inverted COMP 2 signal. When the latch input is equal to 1, Qn is locked in the state assumed at the rising edge of the latch signal. The signal INT-AP is given by: INT-AP=RIT, ANDed with the signal Qn. The output Qn of the latch circuit 60 locks after a time interval Trit has elapsed from the time when COMP 1 is switched from 0 to 1 if COMP 1 has remained at a 1.

Figure 15:
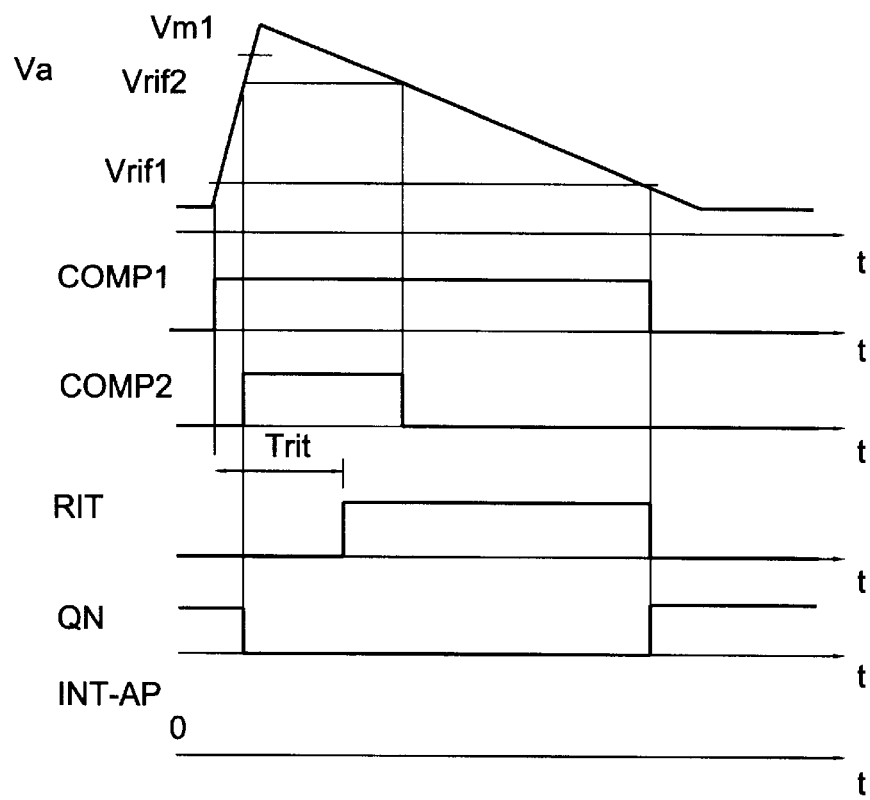
FIG. 15 is a chart showing plots of signal waveforms detected in the circuit of FIG. 14 for a first type of transient.

FIG. 15 illustrates the waveforms produced by the transient 1 in the circuit of FIG. 14. When the voltage Va exceeds Vrif1, the signal COMP 1 switches from 0 to 1 and the delay time Trit starts to elapse. When instead, the voltage Va exceeds Vrif2, the signal COMP 2 switches from 0 to 1 and Qn switches from 1 to 0 since the latch circuit 60 is transparent. The delay Trit has not elapsed yet, since the rising edge of the transient 1 is fast.

When Trit ends, the signal RIT switches from 0 to 1 and the value of COMP 2 is evaluated. The output Qn is locked to the inverted value of COMP 2. When the voltage Va becomes lower than Vrif1, the signal COMP 1 switches from 1 to 0 and the signal RIT switches from 1 to 0 and Qn switches from 0 to 1. The switch 10 of FIGS. 8 and 9 remains closed and the voltage Va is limited to the value Vm1 during the transient.

Figure 16:
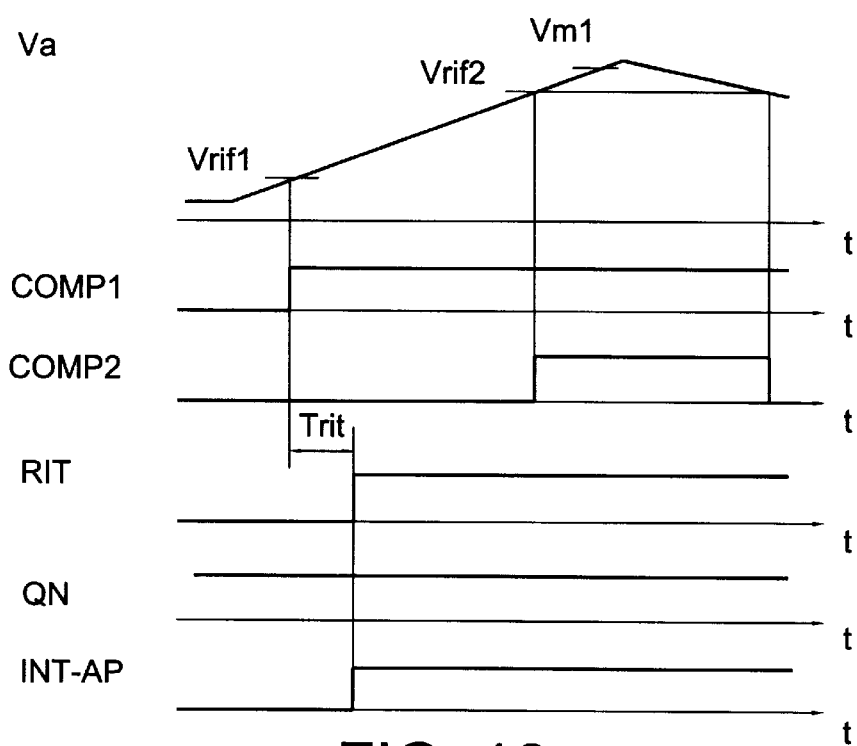
FIG. 16 is a chart showing plots of signal waveforms detected in the circuit of FIG. 14 for a second type of transient.

FIG. 16 illustrates the waveforms produced by the transient 2 in the circuit of FIG. 14. When the voltage Va exceeds Vrif1, the signal COMP 1 switches from 0 to 1 and the delay time Trit starts to elapse. When Trit ends, the value of the signal COMP 2 is evaluated and the output Qn is locked to the value of the inverted signal COMP 2. The voltage Va has not yet exceeded the value Vrif2 and the signal COMP 2 is 0, since the rising edge of the transient 2 is slow. The output signal INT-AP switches from 0 to 1.

When the voltage Va exceeds Vrif2, the signal COMP 2 switches from 0 to 1. The signal Qn remains at the value 1 because the latch circuit 60 is locked and the signal INT-AP remains at the value 1. When the voltage Va returns below Vrif1, the signal COMP 1 switches from 1 to 0, RIT switches from 1 to 0 and the signal INT-AP switches from 1 to 0. During the transient, the switch 10 of FIGS. 8 and 9 opens and the transient suppression intervention voltage is raised to the value Vm2>Vsm2 and the low-voltage, high-energy transient is not suppressed.

The circuit according to the invention fully achieves the intended objects since it allows suppression of high-voltage transients on the power supply line without having to add large and expensive power components. It has been shown that the above circuit is adapted both for bridge circuits and for half-bridge circuits. The circuit thus conceived is susceptible to numerous modifications and variations, all of which are within the scope of the invention. All the details may furthermore be replaced with other technically equivalent elements.

That which is claimed is:

1. An electronic circuit with suppression of high-voltage transients on a power supply line, comprising:

first and second power transistors series-connected between first and second power supplies; and first and second driving circuits for respective first and second power transistors, said first driving circuit comprising a first diode and a first Zener diode, said second driving circuit comprising a second diode and a second Zener diode, anodes of the first diode and the first Zener diode are connected to the cathode of the second Zener diode, a cathode of the first Zener diode is connected to the first power supply, a cathode of the first diode is connected to a gate of the first power transistor, anodes of the second diode and the second Zener diode are connected together, a cathode of the second diode is connected to a gate of the second power transistor.

2. A circuit according to claim 1, wherein the second power supply is ground.

3. A circuit according to claim 1, further comprising:
third and fourth power transistors series-connected between the first and second power supplies; and
third and fourth driving circuits for respective third and fourth power transistors, said third driving circuit comprising a third diode, said fourth driving circuit comprising a fourth diode, an anode of the third diode is connected to the anodes of the first Zener diode and the first diode, a cathode of the third diode is connected to a gate of the third power transistor, an anode of the fourth diode is connected to the anodes of the second Zener diode and the second diode, and a cathode of the fourth diode is connected to a gate of the fourth power transistor.

4. A circuit according claim 3, further comprising fifth and sixth diodes, the sixth diode being interposed between the first and second Zener diodes, cathodes of the fifth and sixth diodes are connected together and to the cathode of the second Zener diode, an anode of the fifth diode is connected to a source of the first power transistor, and an anode of the sixth diode is connected to the anodes of the first diode and the first Zener diode.

5. A circuit according to claim 4, further comprising a seventh diode having a cathode connected to the cathodes of the fifth and sixth diodes, and having an anode connected to a source of the third power transistor.

6. A circuit according claim 1, wherein the first power transistor comprises a P-channel or N-channel DMOS transistor.

7. A circuit according to claim 1, further comprising:
a third Zener diode interposed between the second diode and the second Zener diode, an anode of the third Zener diode is connected to the anode of the second diode and a cathode of the third Zener diode is connected to the anode of the second Zener diode; and
a switch parallel-connected to the third Zener diode and being driven by a control signal.

8. A circuit according to claim 7, further comprising:
a comparison circuit having a first input for receiving a supply voltage, and a second input for receiving a reference voltage; and
a delay circuit having an input for receiving an output of said comparison circuit, and an output of said delay circuit provides the control signal.

9. A circuit according to claim 7, further comprising:
a first comparison circuit having a first input for receiving a supply voltage, and a second input for receiving a first reference voltage;
a second comparison circuit having a first input for receiving the supply voltage, and a second input for receiving a second reference voltage;
a delay circuit having an input for receiving an output of said first comparison circuit, and an output of said delay circuit provides an output signal;
a latch having a first input for receiving the output signal from said delay circuit, and a second input for receiving an output signal from said second comparison circuit; and
a logic circuit having an input for receiving an output of said latch, and a second input for receiving the output signal from said delay circuit, an output of said logic circuit providing the control signal.

10. A circuit according to claim 9, wherein said logic circuit comprises an AND gate.

11. An electronic circuit with suppression of high-voltage transients on a power supply line, comprising:
a circuit for generating a control signal;
a third Zener diode;
a switch parallel-connected to the third Zener diode and being driven by the control signal;
first and second power transistors series-connected between first and second power supplies; and
first and second driving circuits for respective first and second power transistors, said first driving circuit comprising a first diode and a first Zener diode, said second driving circuit comprising a second diode and a second Zener diode, anodes of the first diode and the first Zener diode are connected to the cathode of the second Zener diode, a cathode of the first Zener diode is connected to the first power supply, a cathode of the first diode is connected to a gate of the first power transistor, an anode of the second Zener diode is connected to a cathode of the third Zener diode, anodes of the second diode and the third Zener diode are connected together, a cathode of the second diode is connected to a gate of the second power transistor.

12. A circuit according to claim 11, wherein the second power supply is ground.

13. A circuit according to claim 11, further comprising:
third and fourth power transistors series-connected between the first and second power supplies; and
third and fourth driving circuits for respective third and fourth power transistors, said third driving circuit comprising a third diode, said fourth driving circuit comprising a fourth diode, an anode of the third diode is connected to the anodes of the first Zener diode and the first diode and to the cathode of the second Zener diode, a cathode of the third diode is connected to a gate of the third power transistor, an anode of the fourth diode is connected to the anodes of the third Zener diode and the second diode, and a cathode of the fourth diode is connected to a gate of the fourth power transistor.

14. A circuit according claim 13, wherein the first and third power transistors comprises a P-channel or N-channel DMOS transistor.

15. A circuit according to claim 11, wherein said circuit for generating a control signal comprises:
a comparison circuit having a first input for receiving a supply voltage, and a second input for receiving a reference voltage; and
a delay circuit having an input for receiving an output of said comparison circuit, and an output of said delay circuit provides the control signal.

16. A circuit according to claim 11, wherein said circuit for generating a control signal comprises:
a first comparison circuit having a first input for receiving a supply voltage, and a second input for receiving a first reference voltage;
a second comparison circuit having a first input for receiving the supply voltage, and a second input for receiving a second reference voltage;
a delay circuit having an input for receiving an output of said first comparison circuit, and an output of said delay circuit provides an output signal;
a latch having a first input for receiving the output signal from said delay circuit, and a second input for receiving an output signal from said second comparison circuit; and
a logic circuit having an input for receiving an output of said latch, and a second input for receiving the output signal from said delay circuit, an output of said logic circuit providing the control signal.

17. A circuit according to claim 16, wherein said logic circuit comprises an AND gate.

18. A method for providing suppression of high-voltage transients on a power supply line for an electronic circuit, the method comprising the steps of:

generating a control signal;

parallel-connecting a switch to a third Zener diode, and driving the switch by the control signal;

connecting in series first and second power transistors between first and second power supplies; and providing first and second driving circuits for respective first and second power transistors, the first driving circuit comprising a first diode and a first Zener diode, the second driving circuit comprising a second diode and a second Zener diode, anodes of the first diode and the first Zener diode are connected to the cathode of the second Zener diode, a cathode of the first Zener diode is connected to the first power supply, a cathode of the first diode is connected to a gate of the first power transistor, an anode of the second Zener diode is connected to a cathode of the third Zener diode, anodes of the second diode and the third Zener diode are connected together, a cathode of the second diode is connected to a gate of the second power transistor.

19. A method according to claim 18, wherein the second power supply is ground.

20. A method according to claim 18, further comprising:

connecting in series third and fourth power transistors between the first and second power supplies; and providing third and fourth driving circuits for respective third and fourth power transistors, the third driving circuit comprising a third diode, the fourth driving circuit comprising a fourth diode, an anode of the third diode is connected to the anodes of the first Zener diode and the first diode and to the cathode of the second Zener diode, a cathode of the third diode is connected to a gate of the third power transistor, an anode of the fourth diode is connected to the anodes of the third Zener diode and the second diode, and a cathode of the fourth diode is connected to a gate of the fourth power transistor.

21. A method according claim 20, wherein the first and third power transistors comprises a P-channel or N-channel DMOS transistor.

22. A method according to claim 18, wherein the step of generating a control signal comprises:

providing a comparison circuit having a first input for receiving a supply voltage, and a second input for receiving a reference voltage; and receiving an output of the comparison circuit at an input of a delay circuit, an output of the delay circuit provides the control signal.

23. A method according to claim 18, wherein the step of generating a control signal comprises:

providing a first comparison circuit having a first input for receiving a supply voltage, and a second input for receiving a first reference voltage;

providing a second comparison circuit having a first input for receiving the supply voltage, and a second input for receiving a second reference voltage;

receiving an output of the first comparison circuit at an input of a delay circuit, an output of the delay circuit provides an output signal;

providing a latch having a first input for receiving the output signal from the delay circuit, and a second input for receiving an output signal from the second comparison circuit; and providing the control signal at an output of a logic circuit having an input for receiving an output of the latch, and a second input for receiving the output signal from the delay circuit.

24. A method according to claim 23, wherein the logic circuit comprises an AND gate.

* * * * *

UNITED STATES PATENT AND TRADEMARK OFFICE
CERTIFICATE OF CORRECTION

PATENT NO. : 6,160,694  
DATED : December 12, 2000  
INVENTOR(S) : Angelo Crespi, Vanni Poletto Page 1 of 2

It is certified that error appears in the above-identified patent and that said Letters Patent is hereby corrected as shown below:

Drawings,  
Fig. 3, delete "Fig. 3" insert --

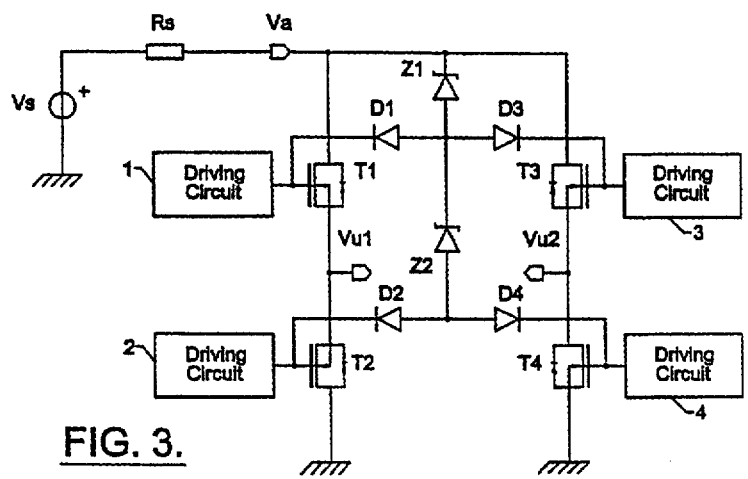

Fig. 15, delete "Fig.15" insert --

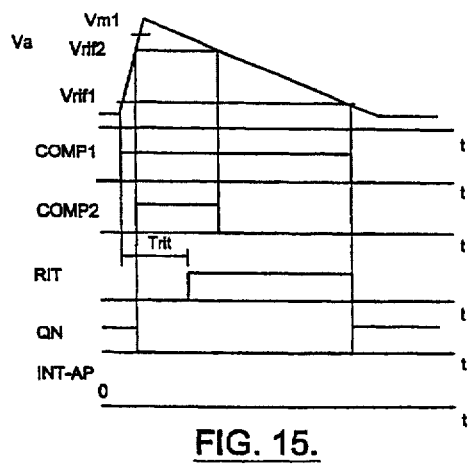

--

UNITED STATES PATENT AND TRADEMARK OFFICE
CERTIFICATE OF CORRECTION

PATENT NO. : 6,160,694
DATED : December 12, 2000
INVENTOR(S) : Angelo Crespi, Vanni Poletto Page 2 of 2

It is certified that error appears in the above-identified patent and that said Letters Patent is hereby corrected as shown below:

Column 3,
Line 45, delete "$V_m=V_{Z1}+V_{Z2}+V_{beD2}+V_{gST2}=V_{Z1}+V_{Z2}+V_{beD4}+V_{gST4}.$"
insert
--$V_m=V_{Z1}+V_{Z2}+V_{beD2}+V_{gST2}=V_{Z1}+V_{Z2}+V_{beD4}+V_{gST4}.$--

Column 4,
Line 5, delete "$V_{z2}=V_{Z1}+V_{beD1}+V_{gST1}=V_{Z1}+V_{beD3}+V_{gST3}.$"
insert
--$V_{z2}=V_{Z1}+V_{beD1}+V_{gST1}=V_{Z1}+V_{beD3}+V_{gST3}.$--

Signed and Sealed this

Fifth Day of March, 2002

*Attest:*

JAMES E. ROGAN
*Attesting Officer*    *Director of the United States Patent and Trademark Office*